(12) United States Patent
Boev et al.

(10) Patent No.: US 11,081,082 B2
(45) Date of Patent: Aug. 3, 2021

(54) MULTIFOCAL DISPLAY DEVICE AND METHOD

(71) Applicant: HUAWEI TECHNOLOGIES CO., LTD., Guangdong (CN)

(72) Inventors: Atanas Boev, Munich (DE); Panji Setiawan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/752,965

(22) Filed: Jan. 27, 2020

(65) Prior Publication Data

US 2020/0160811 A1 May 21, 2020

Related U.S. Application Data

(60) Provisional application No. PCT/EP2017/069088, filed on Jul. 27, 2017.

(51) Int. Cl.
| | |
|---|---|
| G09G 5/02 | (2006.01) |
| G02B 30/26 | (2020.01) |
| G02B 27/01 | (2006.01) |
| G02F 1/1335 | (2006.01) |
| G09G 3/36 | (2006.01) |

(52) U.S. Cl.
CPC ......... *G09G 5/026* (2013.01); *G02B 27/0172* (2013.01); *G02B 30/26* (2020.01); *G02F 1/133526* (2013.01); *G09G 3/3607* (2013.01)

(58) Field of Classification Search
None
See application file for complete search history.

(56) References Cited

U.S. PATENT DOCUMENTS

| | | | | | |
|---|---|---|---|---|---|
| 6,018,329 | A | * | 1/2000 | Kida ............ | G09G 3/2033 345/60 |
| 2007/0242237 | A1 | * | 10/2007 | Thomas .......... | H04N 13/363 353/94 |
| 2009/0103053 | A1 | * | 4/2009 | Ichikawa ........ | G03B 21/008 353/33 |

(Continued)

FOREIGN PATENT DOCUMENTS

| | | |
|---|---|---|
| CN | 103004180 A | 3/2013 |
| CN | 103548074 A | 1/2014 |
| CN | 104160640 A | 11/2014 |
| CN | 106664400 A | 5/2017 |
| EP | 0838799 A1 | 4/1998 |
| EP | 0896317 A2 | 2/1999 |

(Continued)

OTHER PUBLICATIONS

"DLP Technology for Near Eye Display—White Paper", Texas Instruments Incorporated, Sep. 2014. total 18 pages.

(Continued)

*Primary Examiner* — Matthew Yeung
(74) *Attorney, Agent, or Firm* — Leydig, Voit & Mayer, Ltd.

(57) ABSTRACT

The disclosure provides a multifocal display device, comprising a display configured to generate an image, and a controller configured to control the display according to a bit sequence provided over a determined time period to generate the image with one or more colors. The bit sequence includes for each color a subsequence of bits of different significance. Neither the first bit nor the last bit of the subsequence for the respective color is the most significant bit of the subsequence.

13 Claims, 13 Drawing Sheets

(56) References Cited

U.S. PATENT DOCUMENTS

| | | | | |
|---|---|---|---|---|
| 2012/0287144 | A1* | 11/2012 | Gandhi | ............... G09G 3/3413 345/589 |
| 2015/0346495 | A1 | 12/2015 | Welch et al. | |
| 2016/0147078 | A1 | 5/2016 | Bedard et al. | |

FOREIGN PATENT DOCUMENTS

| | | | |
|---|---|---|---|
| JP | H10124001 | A | 5/1998 |
| JP | H10171402 | A | 6/1998 |
| JP | H11109916 | A | 4/1999 |
| JP | 2006251315 | A | 9/2006 |
| JP | 3844013 | B2 | 11/2006 |
| JP | 2008268895 | A | 11/2008 |
| JP | 2009180758 | A | 8/2009 |
| JP | 2014519054 | A | 8/2014 |
| JP | 2016099631 | A | 5/2016 |
| KR | 20130112245 | A | 10/2013 |
| RU | 2597500 | C2 | 9/2016 |
| WO | 9527970 | A1 | 10/1995 |
| WO | 1995027970 | A1 | 10/1995 |
| WO | 2012158549 | A1 | 11/2012 |

OTHER PUBLICATIONS

Kramida, G., "Resolving the Vergence-Accommodation Conflict in Head-Mounted Displays", in IEEE Trans. on Visualization and Computer Graphics, vol. 22, No. 7, Jul. 2016. pp. 1912-1931.

"Datasheet: EL-10-30-Series, Fast Electrically Tunable Lens", Optotune, Jan. 2017. total 16 pages.

Shibata, T et al, "The zone of comfort: Predicting visual discomfort with stereo displays," in J. Vis., Jul. 2011. total 53 pages.

Kramida, G., "Resolving the Vergence-Accommodation Conflict in Head-Mounted Displays", in IEEE Trans. on Visualization and Computer Graphics, vol. 22, No. 7, Jul. 2016. pp. 1932-1931.

Lambooij, M et al., "Visual Discomfort and Visual Fatigue of Stereoscopic Display: A Review", in Journal of Imaging Science and Technology, vol. 53, No. 3, 2009. pp. 1-14.

Hu, X et al., "Design and Assessment of a Depth-Fused Multi-Focal-Plane Display Prototype", in Journal of Display Technology, vol. 10, No. 4, Apr. 2014. pp. 308-316.

Wu, W et al., "Content-Adaptive Focus Configuration for Near-Eye Multi-Focal Displays", in IEEE Intl. Conf. on Multimedia and Expo (ICME), pp. 1-6, Jul. 2016.

Narain, R et al., "Optimal Presentation of Imagery with Focus Cues on Multi-Plane Displays", in ACM Trans. on Graphics, vol. 34, No. 4, Aug. 2015. pp. 1-12.

Shibata, T et al, "The zone of comfort: Predicting visual discomfort with stereo displays," in J. Vis., Jul. 2011. pp. 1-29.

Anonymous:TI training and videos >Applications and designs, Retrieved from the internet:http://www.ti.com/general/docs/video/watch.tsp?entryid=5157963226001. on Mar. 18, 2020. total 2 pages.

Sommerich, R., "How DLP works"—Tutorial, in AV Asia Pacific Magazine. 2009. pp. 64-65.

"Principles of Time Domain Imaging", Forth Dimension Display Limited, 2013, total 19 pages.

* cited by examiner

MULTIFOCAL DISPLAY DEVICE AND METHOD

CROSS-REFERENCE TO RELATED APPLICATIONS

This application is a continuation of International Application No. PCT/EP2017/069088, filed on Jul. 27, 2017, the disclosure of which is hereby incorporated by reference in its entirety.

TECHNICAL FIELD

The disclosure relates to a Multifocal Display (MFD) device and to a corresponding method for providing a multifocal display. The MFD device may specifically be in an optical system like a Near Eye Display (NED) device, a Near-To-Eye (NTE) application or device, or a Head Mounted Display (HMD) device. The disclosure is particularly concerned with providing color to images produced by the MFD device and the method.

BACKGROUND

MFD devices have recently received increasing attention in the industry, due to their ability to create a small, portable and personal viewing experience. Applications of such MFD devices are especially in the category of Augmented Reality (AR), which usually utilizes See-Through NED devices, and Virtual Reality (VR), which usually utilize Immersive NED devices.

An example of a conventional MFD device is shown in FIG. 9. The conventional MFD device shown here in FIG. 9 is of the time-multiplexed type (which differs from a spatial-multiplexed MFD device type). In this conventional MFD, the viewing distance of a single 2D display from an eye of the user is rapidly switched in synchronization with the rendering of frames of multifocal planes, in order to create a potentially flicker-free perception of a 3D image.

This requires, on the one hand, high speed focal modulator elements. These elements may comprise variable power lenses (focus tunable lenses) and are capable of rapidly adjusting or modulating the focal length (or, equivalently, the optical power) of the lens.

For instance, an electrically-focused tunable lens or a deformable membrane mirror device (DMMD) can be used for this purpose. FIG. 10 illustrates how the optical power D of such a lens may be varied over time. Usually, the optical power is varied step-wise, and each optical power corresponds to a different focal plane image of the perceived 3D image. Each optical power level (i.e. each focal plane image) employed by the MFD device (here in FIG. 10 four optical power levels are shown) is used once during a frame duration of, e.g., 1/60 s. For each optical power level (focal plane image), color information (here indicated as 'RGB') is provided, i.e. it has to be provided within an even shorter time period of, e.g., 4.2 ms.

Therefore, on the one hand, an ultrafast display is required, in order to sequentially display color images at a flicker fusion threshold speed of, e.g., a 60 Hz frame rate. This display is a key component for Digital Light Processing (DLP) carried out in the MFD device. The ultrafast display may comprise a Digital Micromirror Device (DMD) or a Liquid Crystal on Silicon (LCOS) device, e.g. a Ferroelectric LCOS (FLCOS) device.

A DMD includes a plurality of micromirrors, wherein each mirror is one pixel of an image to be displayed. The micromirrors are configured to tilt either towards a light source (ON) or away from the light source (OFF), in order to create a light or dark pixel on a projection surface or screen, onto which the light of the light source can be reflected by the micromirrors. For example, an n-bit binary sequence can be used to display $2^n$ greyscale levels (or binary patterns) either by using a Pulse Width Modulation (PWM) or a variable intensity illumination method, wherein the latter is capable of supporting a significantly higher frame rate.

The ultrafast display may further comprise a color element, for instance, realized by a rotating glass wheel with segments of different colors. The color element is arranged between the light source and the DMD, and is employed to provide a color to the light of the light source that illuminates the DMD. Thus, a color image may be produced. This implies that the display comprising the color element and the DMD is controlled by a sequential binary pattern (bit sequence) defining color and exposure arrangement. This is usually known as field sequential color (FSC) operation or Round-robin.

An example of an 8-bit binary pattern for displaying a color image (here only for the Red color) is shown in FIG. 11. The upper portion of FIG. 11 shows the 8-bit binary pattern with 8 bits that are denoted R1, R2, R4, R8, R16, R32, R64, and R128, respectively. R1 is a Least Significant Bit (LSB) or an $8^{th}$ bit plane. R128 is a Most Significant Bit (MSB) or a $1^{st}$ bit plane.

The 8-bit bit sequence is provided by a controller over a certain time period, and for each bit of the sequence, an illumination strength of the color element by the light source is adjusted according to a certain predefined illumination weighting. For each illumination weighting, a corresponding bit plane (a certain image) is provided by, e.g., the DMD. As can be seen in FIG. 11, the $1^{st}$ (most important) bit plane corresponding to the MSB receives the highest illumination weighting, while the $8^{th}$ (least important) bit plane corresponding to the LSB receives the lowest illumination weighting. In the example, the $8^{th}$ bit plane may receive only $1/128$ of the illumination of the $1^{st}$ bit plane. In the end, the different bit planes, here the 8 bit planes corresponding to the 8 bits of the binary pattern, are superposed to form a final image that is output by the display to the focal modulator elements.

FIG. 12 illustrates a problem that occurs in a conventional MFD device. As mentioned above, the optical power of a focus tunable lens is adjusted in the focus modulator elements, namely by applying a control signal (e.g., a controlled electrical current) to the lens. To generate several (e.g., four) optical power levels (for generating several focal plane images)—as shown in FIG. 10—during a frame, a control signal in the form of a step function may be applied. Unfortunately, due to lens inertia, an oscillation artifact (overshoot+ringing) appears in the optical response of the lens, which is characterized by a rise time and a settling time. Such artifacts appear in FIG. 12 at the transitions from one optical power level to the other. Additionally, an oscillation artifact may also appear in the middle of an optical power level (plateau).

Since the binary pattern for creating the color image, as shown in FIG. 11, is provided over the time period of one optical power plateau, as shown in FIG. 12, at least the start and the end of the binary pattern is provided during an artifact, i.e. at the transitions from one level to the other. This can produce severe color artifacts and focal depth artifacts in the final image. Ripples in the optical power and corresponding color and focal depth artifacts may also occur while the control current is kept at a constant level, i.e. in between two successive level changes, as also shown in FIG. 12.

In other words, applying the conventional binary pattern shown in FIG. 11 for each focal plane image in the conventional MFD device of FIG. 9 can produce color and focal depth artifacts in the images, at least due to artifacts during the optical power transitions, since—as shown in FIG. 13—the highest intensity illumination of a particular binary color pattern (e.g., B128) in one focal plane image is followed by the lowest intensity illumination of the next binary color pattern (e.g., R1) in another focal plane image. This can significantly affect the perceived image quality of the generated multifocal (color) image.

SUMMARY

In view of the above-mentioned problems and disadvantages, the disclosure aims at improving the conventional MFD device and method. The disclosure has the object of providing an MFD device and a method that generates improved color images for multifocal display. In particular, the color images should have less color and focal depth artifacts. Especially, negative impacts on the color images due to optical power transitions of the focus tunable lens should be reduced, preferably eliminated.

This object is achieved by the solution specified in the appended independent claims. Advantageous implementations are further defined in the dependent claims.

In particular, the disclosure proposes a solution to the above problem by re-ordering or re-arranging the conventional binary pattern (in the following only referred to as the "bit sequence"). The re-ordering or re-arranging can be done such that illumination pulses illuminating a display device in the display will be timed in accordance with their intensity. More specifically, it is proposed to generate illumination pulses of high intensity during steady state periods of the lens optical response and less intense illumination pulses during or near the non-steady state periods. Further, human eye sensitivity to different colors can be taken into account.

A first aspect of the disclosure provides an MFD device comprising a display configured to generate an image, a controller configured to control the display according to a bit sequence provided over a determined time period to generate the image with one or more colors, the bit sequence including for each color a number of bits of different significance, wherein for each color, neither the first bit nor the last bit of the subsequence is the most significant bit of the subsequence.

Arranging the bits in this the manner, i.e. as specified by the bit sequence, has the effect that an MSB (corresponding to the highest intensity illuminations) of each color will appear neither at the start nor at the end of each frame exposure sequence, and thus will not be used when the oscillation artifacts are expected to be strongest. In other words, the MSB will appear not during, but after an optical power transition, when the amplitude of the lens oscillations has decreased. Thus the artifacts occurring during optical power transitions of a focus tunable lens will not impact on the MSB. This reduces color and focal depth artifacts in the final integrated image, and improves the overall quality of the generated image.

In one implementation form of the first aspect, the first bit and the last bit of the subsequence are the two least significant bits of the subsequence. That is, the first bit is the LSB and the second bit is the second-least significant bit (also referred to as the second LSB), or vice versa.

This reduces color and focal depth artifacts in the generated image.

In a particular implementation form, the subsequence increases monotonically in significance from the first bit to the most significant bit of the subsequence and decreases monotonically in significance from the most significant bit to the last bit of the subsequence.

This reduces color and focal depth artifacts in the generated image.

In a further implementation form of the first aspect, there at two or more colors and their corresponding subsequences of bits are interleaved with each other.

As a consequence, oscillation artifacts do not impact predominantly on one specific color, but equally on all colors, thus providing an overall better color image.

In a further implementation form of the first aspect, the one or more colors include Green color and Red or Blue color, and the first bit or the last bit, or both the first bit and the last bit of the sequence is for Red or Blue color.

In this way, differences in the sensitivity of the human eye to different colors are taken into account. In particular, since the human eye is more sensitive to Green, and less sensitive to Blue and Red, it can be beneficial to arrange these latter colors at positions where the optical response artifacts occur. Artifacts in the generated image can thus become less perceptible. The perceived quality of the image can thus improve.

In a further implementation form of the first aspect, an even bit of a color is arranged closer to the start of the bit sequence than an odd bit of the same color, while an odd bit of the same color is arranged closer to the end of the bit sequence than an even bit of the same color, or an odd bit of a color is arranged closer to the start of the bit sequence than an even bit of the same color, while an even bit of the same color is arranged closer to the end of the bit sequence than an odd bit of the same color.

That means, for instance, that the even bit planes may be illuminated first based on some color arrangement, followed by illuminating the odd bit planes in, for instance, a reversed ordering based on the same color arrangement. The change of the arrangement in the middle of the bit sequence, which is a consequence of the specified odd/even bit arrangement, may expose a specific color during optical power transitions. For instance, the Blue color, to which the human eye is least sensitive, may be exposed during transitions of the optical power of the lens.

In a further implementation form of the first aspect, even bits are arranged in the subsequence in an order reverse to an order of odd bits in the subsequence.

Thus, for each significance, the color, to which the human eye is least sensitive, can be positioned closer to the start or end of the bit sequence.

In a further implementation form of the first aspect, the controller is configured to provide the bits of the bit sequence at irregular intervals over the determined time period.

Thereby, notably the frame rate is still constant and regular. For instance, in the presence of an expected major ripple within an optical power plateau of the lens, i.e. in the middle of the bit sequence, the timing interval in the bit sequence and/or between bit sequences can be adjusted, in order to avoid illumination pulses during these ripples.

In a further implementation form of the first aspect, the controller is configured to provide the bit sequence offset in time from a start and/or an end of the predetermined time period.

Thereby, major oscillation artifacts at the optical power transitions between focal plane images can be avoided.

In a further implementation form of the first aspect, the MFD device further comprises a storage storing a plurality of bit groups, the bit sequence being a concatenation of these bit groups, wherein the controller is configured to control the display according to a first bit group during a first section of the determined time period, and according to a second bit group during a second section of the determined time period.

Thus, illumination pulses may be split into two or more groups, for instance if a major ripple is expected in the center of the lens optical response. The groups can be arranged such that the position of the major ripple is left as a gap between the groups.

In a further implementation form of the first aspect, the MFD device further comprises a storage storing at least one predetermined time point or time range, within the determined time period, wherein the controller is configured to arrange less significant bits of one or more colors at the time point or within the time range, and more significant bits of these colors not at the time point or outside the time range.

The stored time point or time range can indicate, for instance, the presence of a major ripple within an optical power plateau. Thus, a MSB can be arranged such that it is not affected by this major ripple.

In a further implementation form of the first aspect, the display comprises a DMD or an LCOS, each bit of the bit sequence determines an intensity of light for illuminating the DMD or the LCOS, and a less significant bit relates to lower illumination intensity of the light.

In a further implementation form of the first aspect, the MFD device further comprises a color element configured to provide the light for illuminating the DMD or LCOS with different colors, wherein each bit of the bit sequence relates to a color provided to the light.

In a further implementation form of the first aspect, the bit sequence includes at least six bits for each of a Red, Green and Blue color, in order to generate by the display an at least 18-bit color image.

In a further implementation form of the first aspect, the MFD device further comprises a focus tunable lens, wherein the controller is configured to selectively tune the focus of the lens to a plurality of focal planes of different index during a frame period, and to one of these focal planes during a determined time period.

The different focal planes are selected by adjusting the optical power of the lens, which may be achieved by providing a control signal of different value for each focal plane, e.g. a current signal with different current intensities.

In a further implementation form of the first aspect, the controller is configured to control the display according to different bit sequences in dependence of the focal plane index during the predetermined time period and/or in dependence of a focal plane index during a previous and/or a next determined time period.

Thereby, major ripples, which are characteristics of a specific optical power plateau (i.e. of a focal plane of a certain index), can be taken into account by adjusting the bit sequence accordingly. Furthermore, depending on the focal plane index during a focal plane transition, different kinds of artifacts may occur, and a different arrangement of the bit sequence may be required. That is, a carefully controlled bit sequence may be provided to guarantee that each light intensity in the sequence force into the lens optical response reaching having a relatively constant (steady-state response) optical power. Each bit sequence may appear with a different offset in a focal plane.

A second aspect of the disclosure provides a method for providing a MFD, comprising steps of controlling a display according to a bit sequence provided over a determined time period to generate an image with one or more colors, the bit sequence including for each color a subsequence of bits of different significance, wherein for each color, neither the first bit nor the last bit of the subsequence for the respective color is the MSB of the subsequence.

In an implementation form of the second aspect, the first bit and the last bit of the subsequence are the two least significant bits of the subsequence.

In an implementation form of the second aspect, the subsequence increases monotonically in significance from the first bit to the most significant bit of the subsequence and decreases monotonically in significance from the most significant bit to the last bit of the subsequence.

In an implementation form of the second aspect, the subsequences of bits associated with different colors are interleaved with each other in the bit sequence.

In a further implementation form of the second aspect, the one or more colors include Green color and Red or Blue color, and the first bit or the last bit, or both the first bit and the last bit of the sequence is for Red or Blue color.

In a further implementation form of the second aspect, even bits are arranged in the subsequence in an order reverse to an order of odd bits in the subsequence.

In a further implementation form of the second aspect, the bits of the bit sequence are provided at irregular intervals over the determined time period.

In a further implementation form of the second aspect, the bit sequence is provided offset in time from a start and/or an end of the predetermined time period.

In a further implementation form of the second aspect, the method further comprises storing a plurality of bit groups, the bit sequence being a concatenation of these bit groups, wherein the display is controlled according to a first bit group during a first section of the determined time period, and according to a second bit group during a second section of the determined time period In a further implementation form of the second aspect, the method further comprises storing at least one predetermined time point or time range, within the determined time period, wherein less significant bits of one or more colors are arranged at the time point or within the time range, and more significant bits of these colors are not arranged at the time point or outside the time range.

In a further implementation form of the second aspect, the display comprises a DMD or an LCOS, each bit of the bit sequence determines an intensity of light for illuminating the DMD or the LCOS, and a less significant bit relates to lower illumination intensity of the light.

In a further implementation form of the second aspect, the method further comprises providing the light for illuminating the DMD or LCOS with different colors, wherein each bit of the bit sequence relates to a color provided to the light.

In a further implementation form of the second aspect, the bit sequence includes at least six bits for each of a Red, Green and Blue color, in order to generate by the display an at least 18-bit color image.

In a further implementation form of the second aspect, the method further comprises selectively tuning the focus of a focus tunable lens to a plurality of focal planes of different index during a frame period and to one of these focal planes during a determined time period.

In a further implementation form of the second aspect, the display is controlled according to different bit sequences in dependence of the focal plane index during the predetermined time period and/or in dependence of a focal plane index during a previous and/or a next determined time period.

With the method of the second aspect and its implementation forms, all the advantages and effects of the MFD device of the first aspect and its implementation forms, respectively, can be achieved.

A third aspect of the disclosure provides a computer program product comprising a program code for controlling a MFD device according to the first aspect or any of its implementation forms.

Accordingly, the advantages and effects of the MFD device of the first aspect can be achieved.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above-described aspects and implementation forms will be explained in the following description of specific embodiments in relation to the enclosed drawings, in which:

FIG. 3 shows a bit sequence used in an MFD device according to an embodiment.

FIG. 8 also shows a bit sequence used in an MFD device according to an embodiment.

DETAILED DESCRIPTION OF EMBODIMENTS

Figure 1:
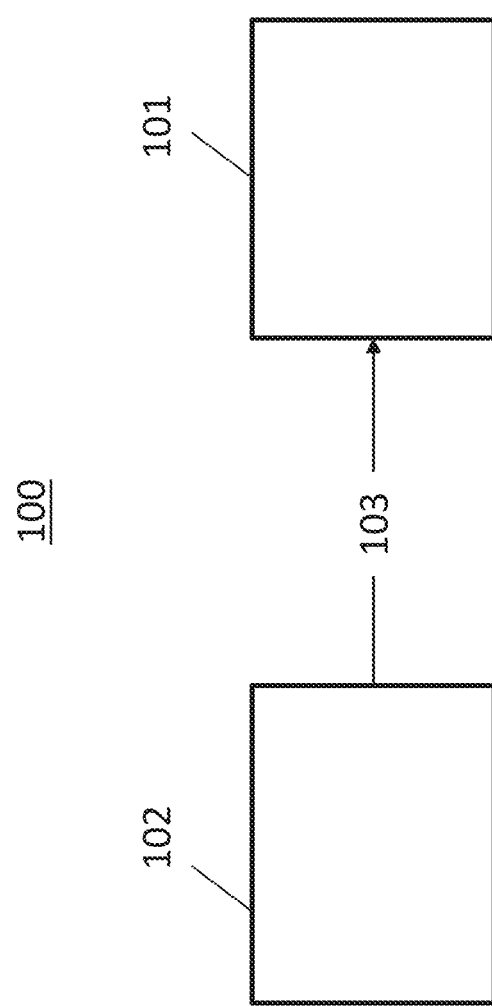
FIG. 1 shows an MFD device according to an embodiment.

FIG. 1 shows an MFD device 100 according to an embodiment. The MFD device 100 may be an NED device, NTE device or HMD device, or may be provided in any such device.

The MFD device 100 includes a display 101, which may comprise a DMD or LCOS, and may further comprise a color element, like a color wheel. Further, the MFD device 100 includes a controller 102, which may be a computer processor, a microcontroller, or the like.

The controller 102 is configured to control the display 101 according to a bit sequence 103 provided over a determined time period. That is, the controller 102 provides the bit sequence 103 to the display 101 over the determined time period, wherein the determined time period is, for instance, the duration of one focal plane image. The display 101 is configured to generate an image in accordance with the bit sequence. In particular, the display 101 is configured to generate the image with one or more colors, wherein the bit sequence 103 includes for each color of this image a subsequence of bits of different significance.

For each color, in order to avoid that the MSB of that color appears at a time where artifacts such as overshoots occur in the optical power of the lens, neither the first bit nor the last bit of the subsequence for the respective color is the most significant bit of the subsequence.

Figure 2:
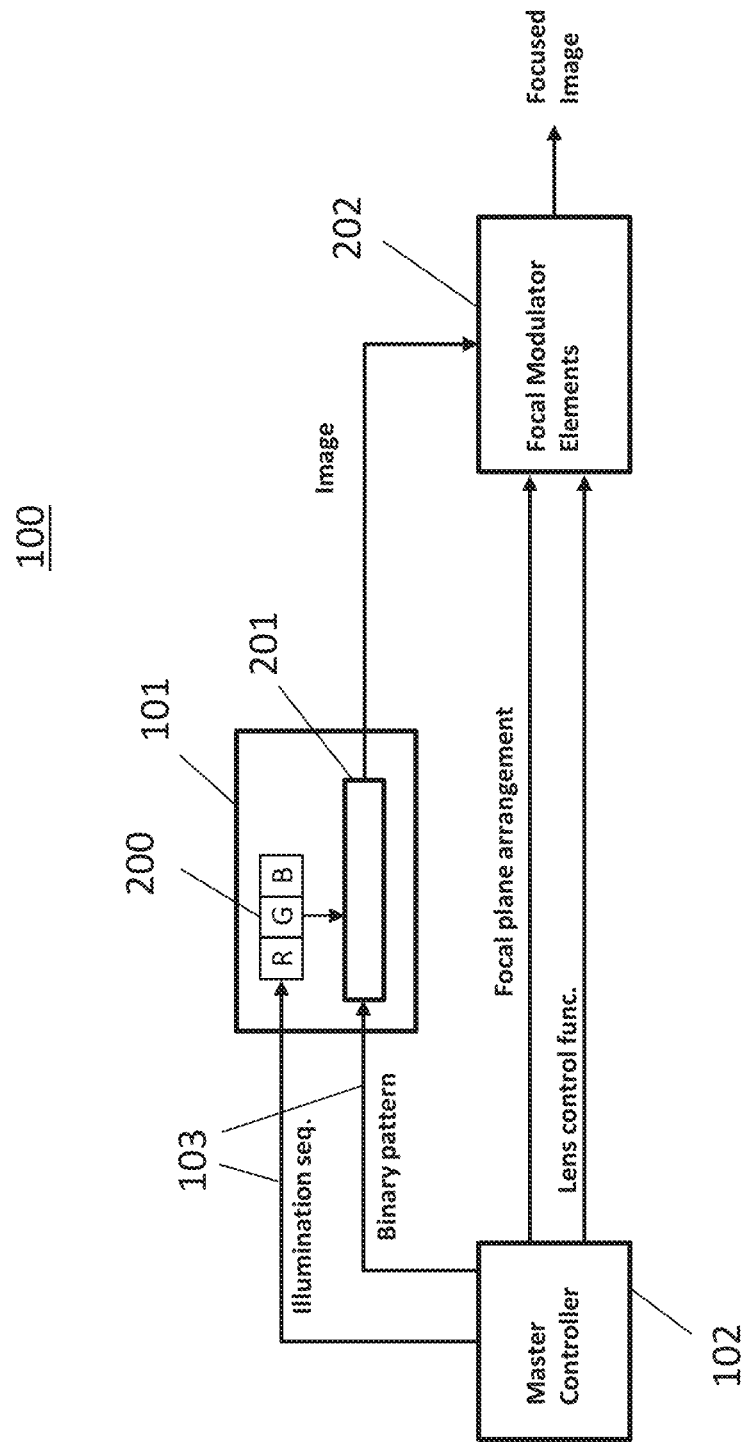
FIG. 2 shows an MFD device according to an embodiment.

FIG. 2 shows an MFD device 100 according to an embodiment which builds on the MFD device 100 shown in FIG. 1. Again, the MFD device 100 includes the display 101 and the controller 102, which provides to the display 101 a bit sequence 103. Here the bit sequence 103 may be, or may include, an 'illumination sequence', which determines how strong the illumination of the corresponding bit plane will be, and/or one or more 'binary patterns', according to which the display 101 produces the different bit planes. The display 101 includes preferably a DMD 201 (or an LCOS), which receives from the controller 102 the one or more binary patterns, wherein a binary pattern determines whether the DMD 201 is flipped to ON "1" or OFF "0". The illumination sequence and the binary patterns may accordingly be derived from the bit sequence 103. Each bit plane is illuminated according to the illumination sequence.

The display 101 of FIG. 2 also includes a color element 200, which is configured to provide the light illuminating the DMD 201 (or LCOS) with different colors, wherein each bit of the bit sequence 103 relates to a color provided to the light. In this way, the display 101 generates a bit plane for each bit and then integrates these bit planes into an image for one focal plane.

This image is then preferably, as shown in FIG. 2, provided to a focus tunable lens 202. That is, the MFD device 100 of FIG. 2 also comprises a focus tunable lens 202. The focus tunable lens 202 may be a single lens or a compound lens. A compound lens is a lens assembly in which two or more elementary lenses are placed one after the other. The controller 102 is further configured to selectively tune the focus of the lens 202 to a plurality of focal planes of different index during a frame period, and to one of these focal planes during the determined time period over which the bit sequence 103 is provided. This may be achieved by the controller 102 providing a 'lens control function' and a 'focal plane arrangement' to the focus tunable lens 202.

Figure 4:
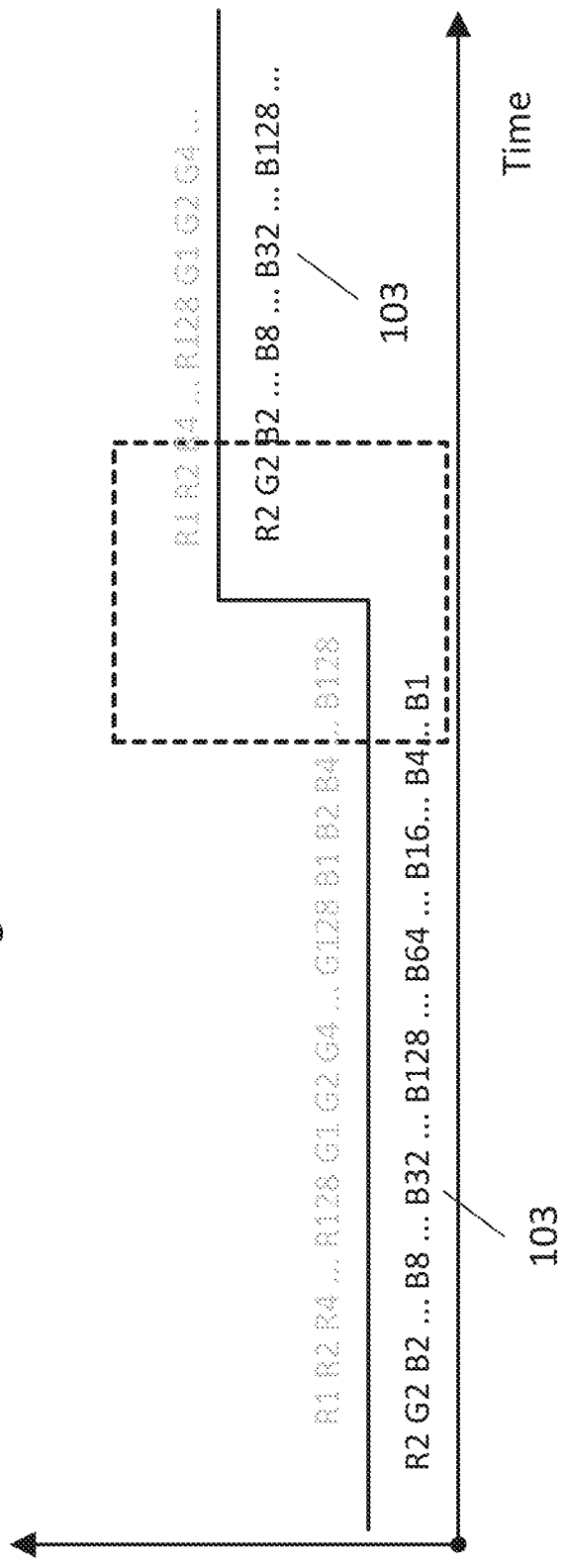
FIG. 4 shows an arrangement of bit sequences at an optical power transition.

FIG. 3 shows a bit sequence 103 used by the controller 102 of the MFD device 100 according to FIG. 1 or 2. It can be seen that the bits R2, G2, B2 are arranged close to the start of the bit sequence 103, while the bits R1, G1, B1 are arranged close to the end of the bit sequence 103. R1, G1 and B1 denote the LSBs of the colors Red, Green and Blue. R2, G2, B2 denote the second-least significant bits of the colors Red, Green and Blue. Accordingly, a less significant bit of each color is arranged closer to, or at the same distance to a start and/or an end of the bit sequence 103 than a more significant bit of each color. With this arrangement, and a likewise bit sequence 103 used for the next (or previous) focal plane image, only the LSBs will be exposed during optical power transitions, and will suffer from the artifacts occurring at these transitions. This is illustrated in FIG. 4, which shows the development of the optical power D over time, particularly an optical power step to control the lens 202 from one focal plane to the other. During the duration of each optical power level, the bit sequence 103 is provided, and it can be seen that in the critical region of the optical power transition, only the LSBs B1, R2 (and maybe G2, B2) are illuminated, and thus affected by artifacts, while in the conventional MFD device (see the grey bit sequence depicted for comparison) also at least one MSB bit, namely B128, is affected.

Figure 5:
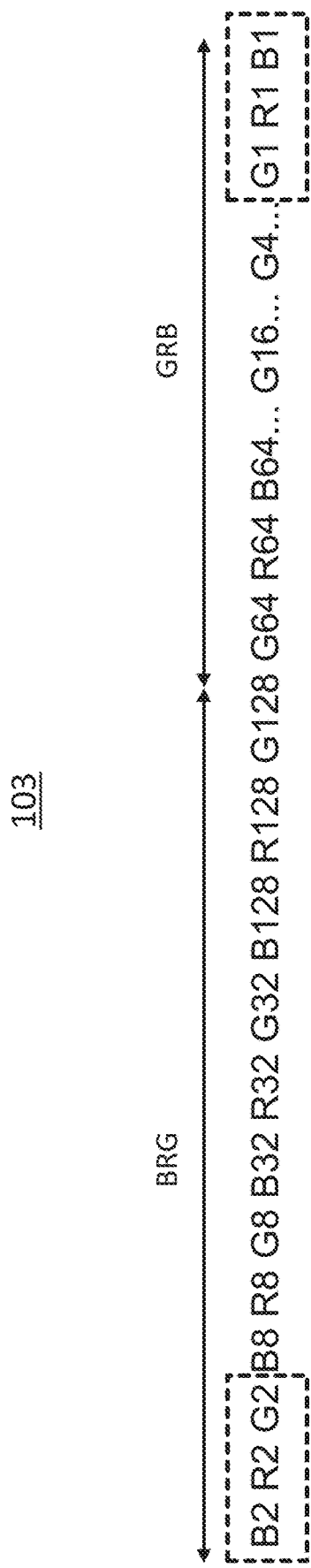
FIG. 5 shows a bit sequence used in an MFD device according to an embodiment.

FIG. 5 shows another bit sequence 103, which may be used by the MFD device 100 of FIGS. 1 and 2, respectively. Here, since human eyes are more sensitive to Green color and less sensitive to Blue and Red colors, the even bit planes are firstly illuminated based on a BRG color field arrangement (e.g. as shown: B2, R2, G2, B8, R8, G8, B32, R32, G32, B128, R128, G128) and are followed by the odd bit planes illuminated in reverse ordering based on a GRB color field arrangement (e.g. as shown: G64, R64, B64, G16, R16, B16, G4, R4, B4, G1, R1, B1).

Figure 6:
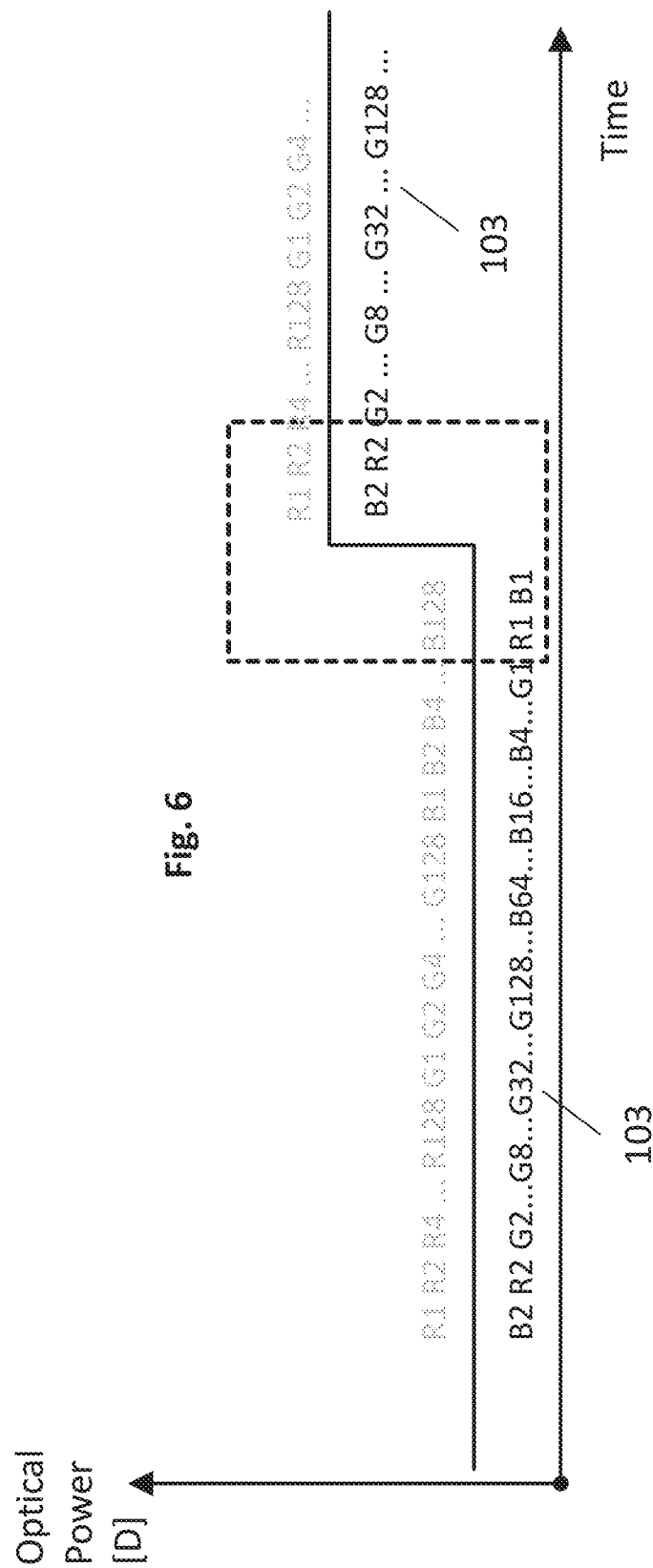
FIG. 6 shows an arrangement of bit sequences used at an optical power transition.

Thus, the subsequent exposure of bit planes for a next focal plane will only expose the LSBs during optical power transition, and additionally the change of color field arrangement in the middle of the bit sequences 103 exposes the color Blue during an optical power transition. This can be seen in FIG. 6, where the blue bits B1 and B2 are at the power transition, whereas in the conventional MFD device (bit sequence depicted in grey for comparison) the Red bit R1 and the MSB of the Blue color B128 are at the power transition. Notably, depending on the optical transition artifact experienced during the two optical power steps, the LSBs R1, B1 and B2, R2 could even be omitted.

Figure 7:
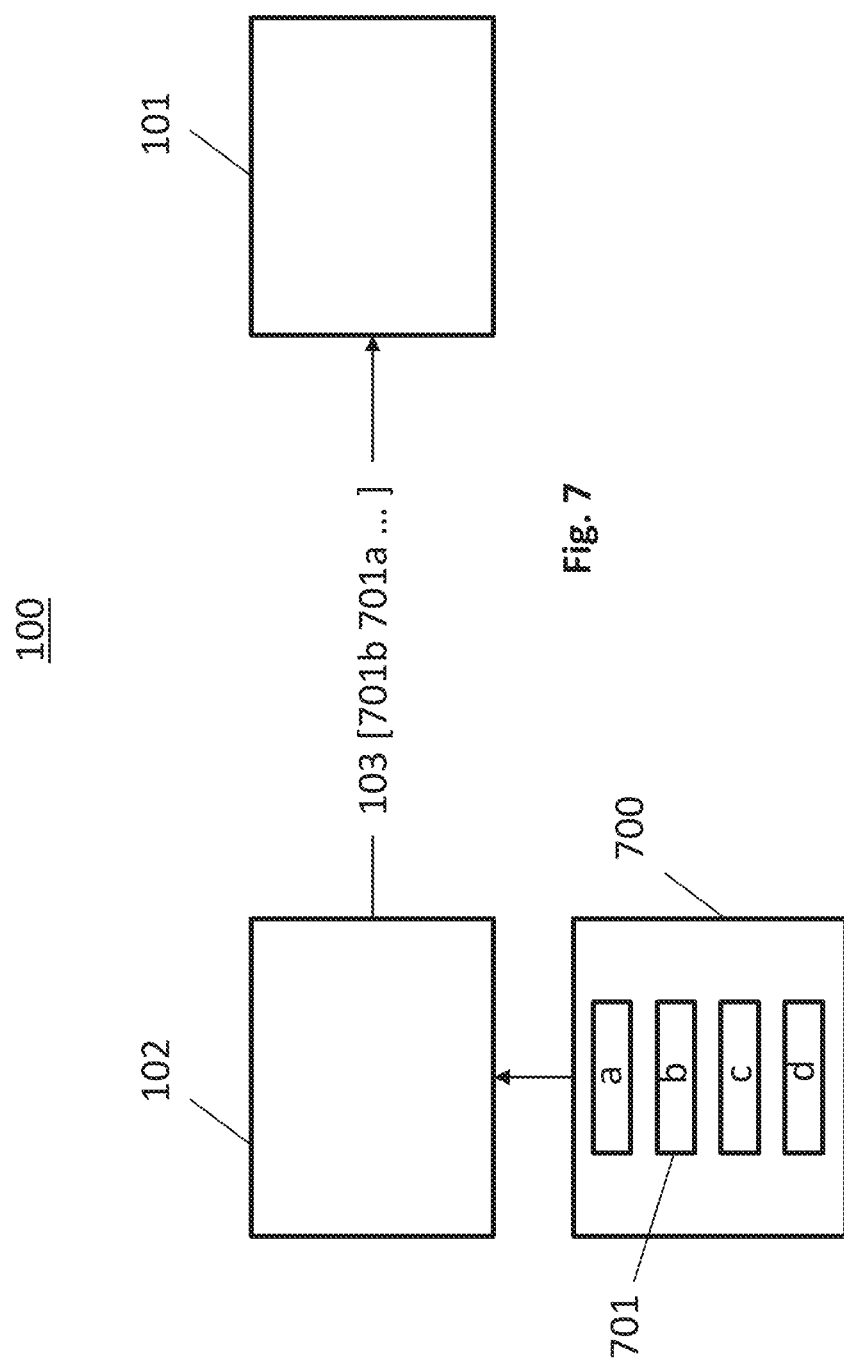
FIG. 7 shows an MFD device according to an embodiment.

FIG. 7 shows an MFD device 100 according to an embodiment which builds on the MFD device 100 shown in FIG. 1. The MFD device 100 includes additionally a storage 700, which stores a plurality of bit groups 701 (different bit groups are here labeled 701a, 701b, 701c and 701d for exemplary four bit groups). The bit sequence 103 may be concatenated by the controller 102 using the bit groups 701 in the storage 700. Especially, the controller 102 is configured to control the display 101 according to a first bit group 701b during a first section of the determined time period, and according to a second bit group 701a during a second section of the determined time period. In a third section of the determined time period in the present example the bit group 701c may follow, and the fourth section of the determined time period may be related to the final fourth bit group 701d. However, also more than four bit groups may be used, and different sections controlled according to different bit groups may be at any position in the bit sequence 103.

Figure 8:
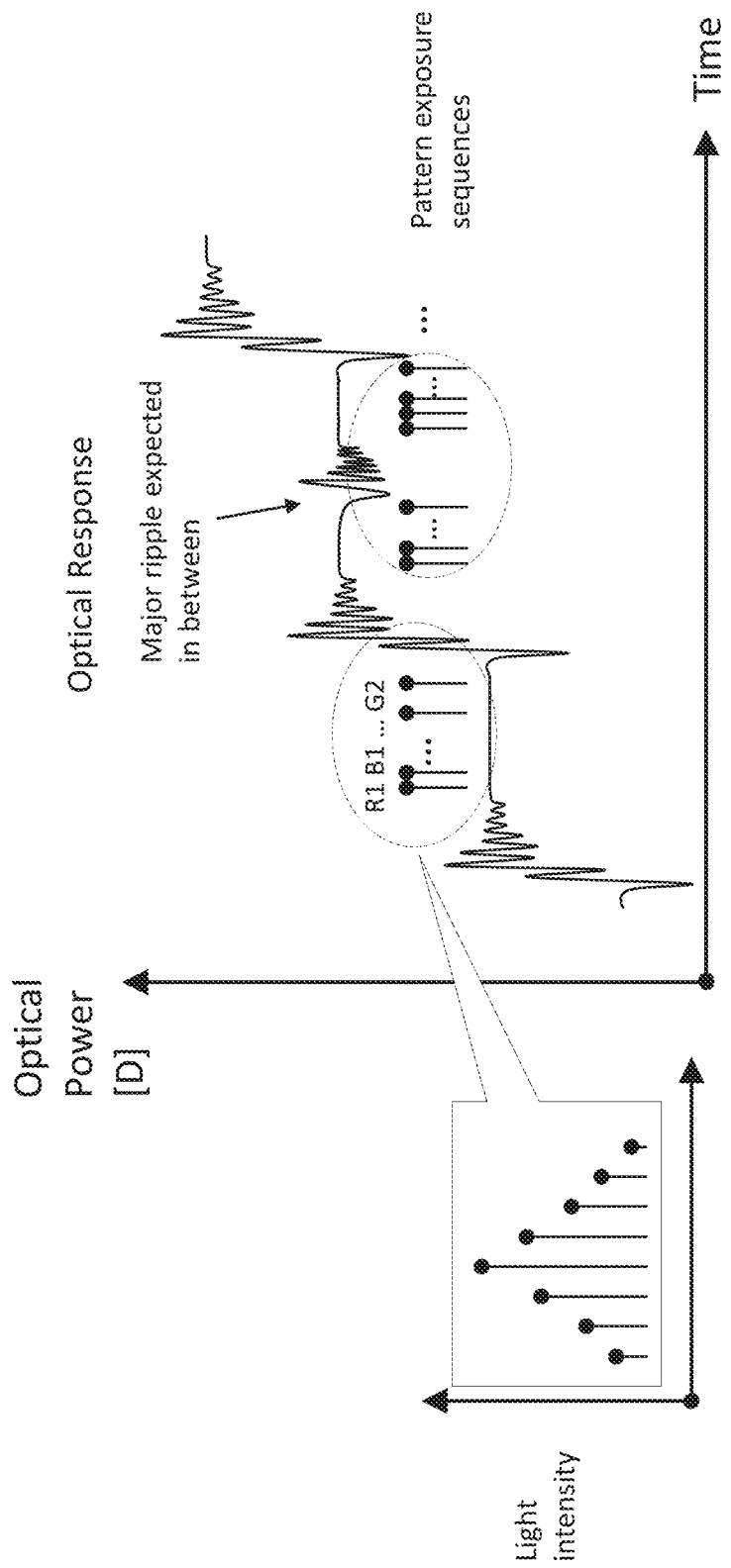
FIG. 8 shows an optical response of a lens during a focal plane transition.
Figure 9:
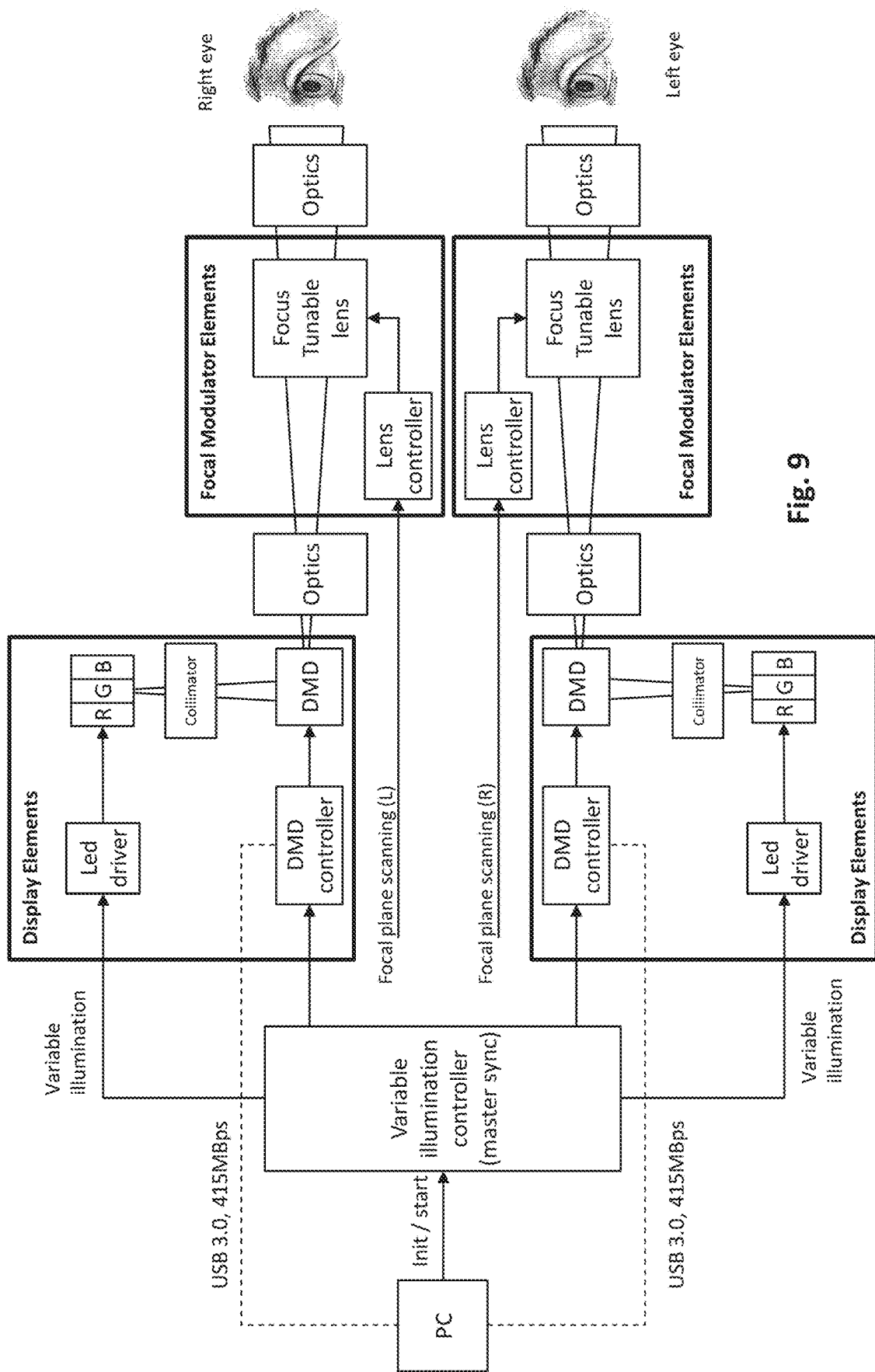
FIG. 9 shows a conventional MFD device.
Figure 10:
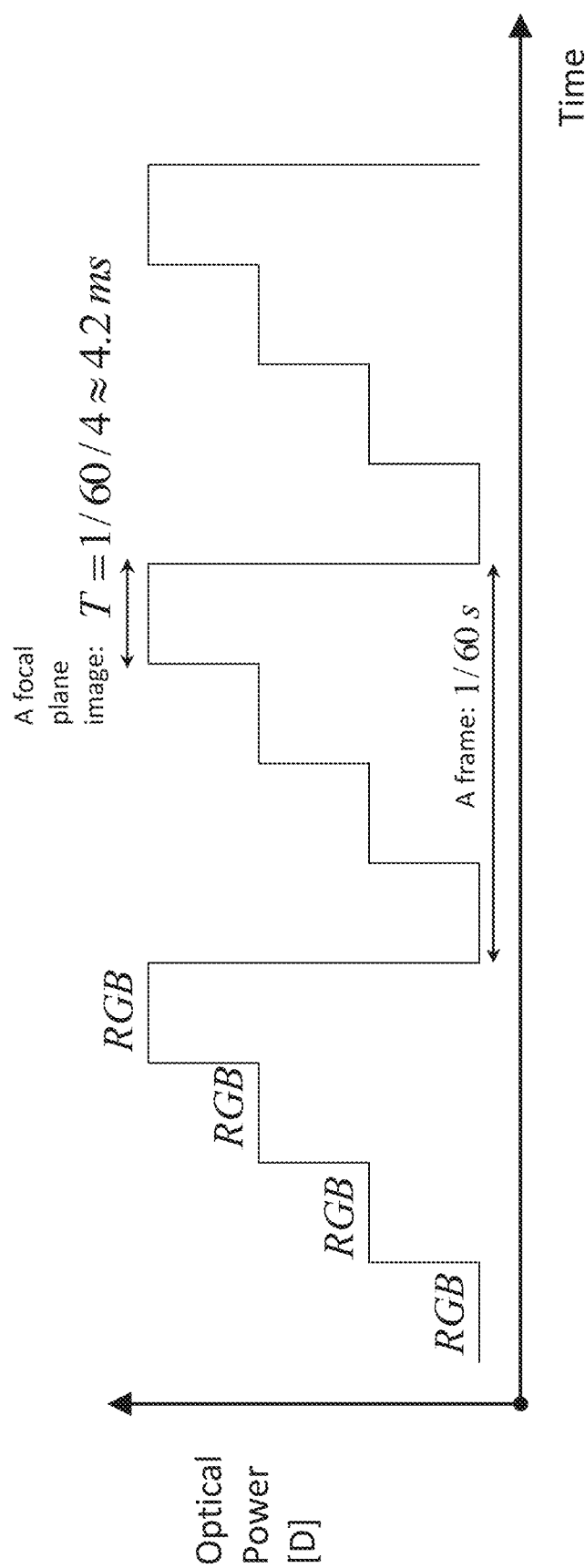
FIG. 10 shows optical power transitions of different focal planes over time.
Figure 11:
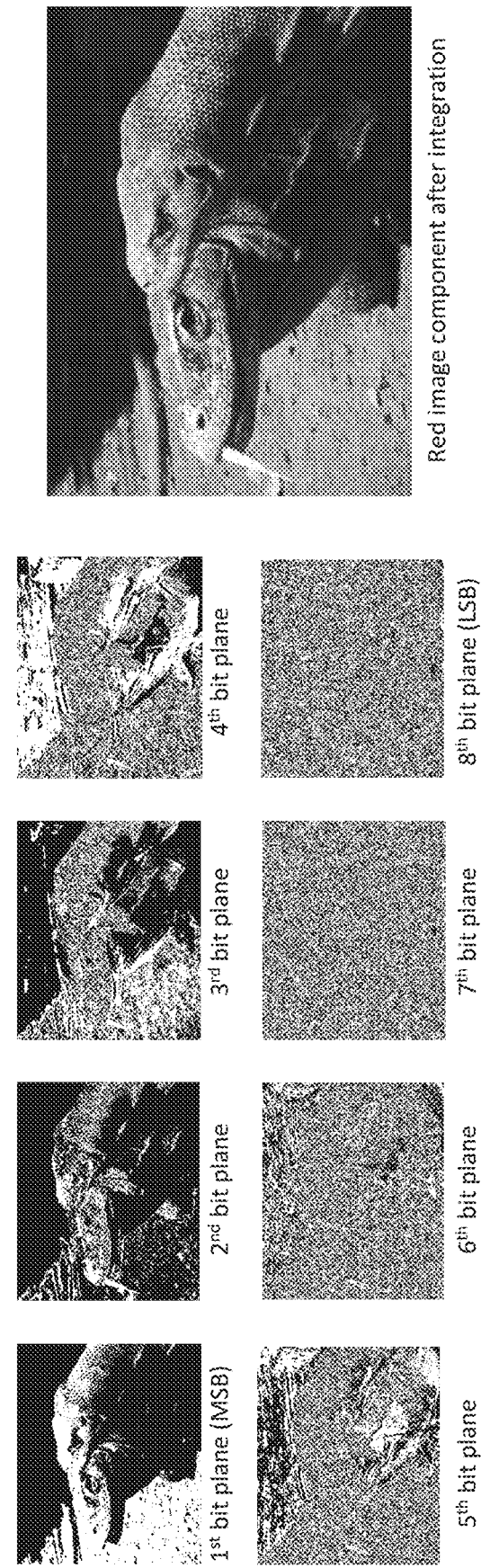
FIG. 11 shows a conventional 8-bit binary pattern sequence for Red color.
Figure 12:
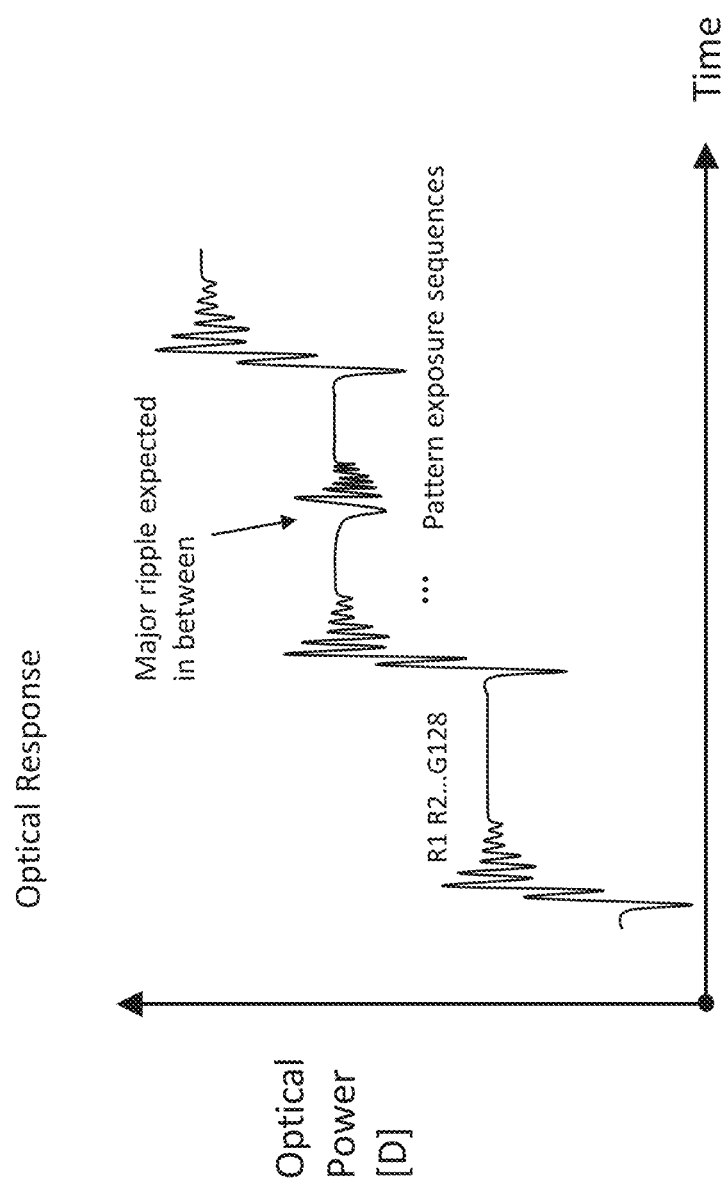
FIG. 12 shows an optical response of a focus tunable lens.
Figure 13:
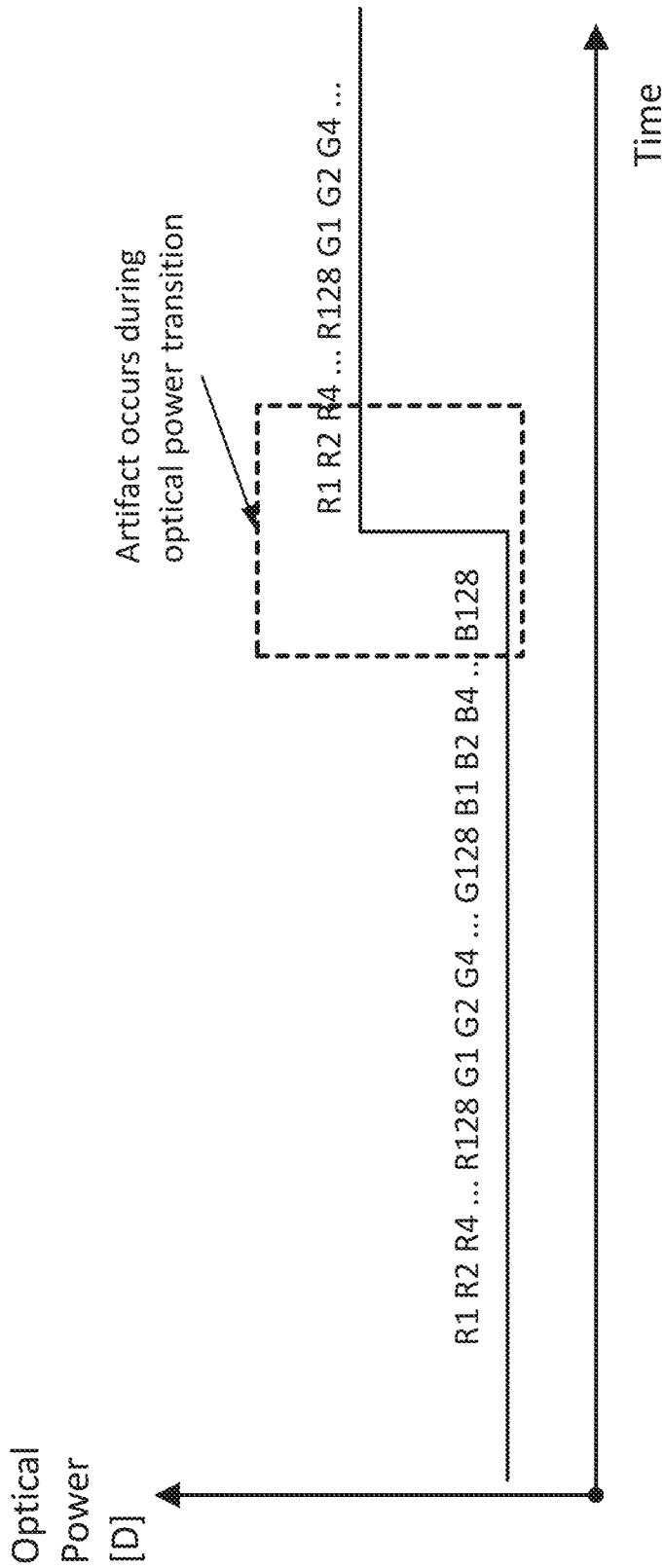
FIG. 13 shows the use of a conventional bit sequence during a power transition.

In particular, the two or more groups may split the illumination pulses, if a major ripple is expected in the center of a lens step response, i.e. in the center of an optical power plateau. This is, for instance, shown in FIG. 8, where an optical power transition between two optical powers is shown over time. During the first optical power plateau there is no major ripple. The bit sequence 103 is such that the light intensity for the illumination light is highest in the center of the plateau. More specifically, the more significant bits are arranged further away from a start or end of the bit sequence 103 while the less significant bits are arranged closer to the start or end of the bit sequence 103.

During a second optical plateau, a major ripple appears approximately in the middle of the predetermined time period. Since the position of the major ripple is known in advance, a carefully adjusted bit sequence 103 can be provided by the controller 102 to the display 101. Thus, no light intensity is scheduled in the vicinity of the ripple. To this end, for instance, the two groups can split the bit sequence 103.

Alternatively, the storage 700 may also store at least one predetermined time point, or time range, within the determined time period, which for instance corresponds to the position and/or duration of the major ripple. Then, the controller 102 may be configured to arrange less significant bits of one or more color, or no bits at all, at the time point or within the time range and more significant bits of these colors not at the time point or outside this time range of the major ripple.

Those skilled in the art can devise and implement variations of the above described embodiments without departing from the scope of the claims. In the claims as well as in the description, the verb "comprise" does not exclude further elements or steps and the indefinite article "a" or "an" does not exclude a plurality. A single element or other unit may fulfill the function of several entities or items recited in the claims. The mere fact that certain measures are recited in different claims does not indicate that a combination of these measures cannot be used in an advantageous implementation.

The invention claimed is:

1. A multifocal display device, comprising:
a display configured to generate a pixelated image with one or more colors,
a storage storing a plurality of bit groups,
a focus tunable lens, and
a controller configured to, during a respective time period in a frame period:
tune a focus of the focus tunable lens to a focal plane and control an illumination intensity of the display in accordance with a bit sequence provided for a pixel over the respective time period,
wherein the bit sequence includes, for each color of the one or more colors, a respective subsequence of bits of different significance, and wherein, for each respective subsequence, neither the first bit nor the last bit of the respective subsequence is a most significant bit of the respective subsequence,
wherein the bit sequence comprises a concatenation of the plurality of bit groups in the storage, and
wherein the controller is further configured to control the display, during a first section of the time period, according to a first bit group and, during a second section of the time period, according to a second bit group.

2. The multifocal display device according to claim 1, wherein the first bit and the last bit of each respective subsequence are two least significant bits of the first respective subsequence.

3. The multifocal display device according to claim 2, wherein each respective subsequence increases monotonically in significance from a first bit of the respective subsequence to a most significant bit of the respective subsequence and decreases monotonically in significance from the most significant bit of the respective subsequence to a last bit of the respective subsequence.

4. A multifocal display device according to claim 1, wherein the one or more colors are two or more colors and their corresponding subsequences of bits are interleaved with each other.

5. The multifocal display device according to claim 1, wherein the one or more colors include Green and at least one of Red and Blue, and the first bit or the last bit, or both the first bit and the last bit of the sequence is for Red or Blue.

6. The multifocal display device according to claim 1, wherein even bits are arranged in the subsequence in an order reverse to an order of odd bits in the subsequence.

7. The multifocal display device according to claim 1, wherein the controller is configured to provide the bits of the bit sequence at irregular intervals over the time period.

8. The multifocal display device according to claim 1, wherein the controller is configured to provide the bit sequence offset in time from a start or an end of the time period.

9. The multifocal display device according to claim 1, wherein the display comprises a Digital Micromirror Device (DMD) or a Liquid Crystal On Silicon (LCOS),
   wherein a significance of each bit of the bit sequence is in accordance with an intensity of light for illuminating the DMD or the LCOS.

10. The multifocal display device according to claim 9, further comprising:
   a color element configured to provide the light for illuminating the DMD or LCOS with different colors, wherein each bit of the bit sequence relates to a color provided to the light.

11. The multifocal display device according to claim 1, wherein the bit sequence includes at least 6 bits for each of a Red color, a Green color, and a Blue color, in order to generate, by the display, an at least 18-bit color image.

12. A method for generating a pixelated multifocal image with one or more colors, wherein, during a time period in a frame period, the method comprises:
   tuning a focus of a lens to a focal plane and controlling an illumination intensity of a display in accordance with a bit sequence provided for a pixel over a time period,
   wherein the bit sequence includes, for each color, a respective subsequence of bits of different significance,
   wherein for each respective subsequence, neither the first bit nor the last bit is a most significant bit of the respective subsequence,
   wherein the bit sequence comprises a concatenation of a plurality of bit groups stored in a storage, and
   wherein controlling the illumination intensity of the display comprises, during a first section of the time period, controlling the intensity according to a first bit group in the bit sequence and, during a second section of the time period, controlling the intensity according to a second bit group in the bit sequence.

13. A computer-readable medium comprising a program code for controlling a multifocal display device according to claim 1.

* * * * *

UNITED STATES PATENT AND TRADEMARK OFFICE
CERTIFICATE OF CORRECTION

| | |
|---|---|
| PATENT NO. | : 11,081,082 B2 |
| APPLICATION NO. | : 16/752965 |
| DATED | : August 3, 2021 |
| INVENTOR(S) | : Boev et al. |

It is certified that error appears in the above-identified patent and that said Letters Patent is hereby corrected as shown below:

On the Title Page

Applicant (71): "HUAWEI TECHNOLOGIES CO., LTD., Guangdong (CN)" should read
-- HUAWEI TECHNOLOGIES CO., LTD., Shenzhen (CN) --.

Signed and Sealed this
Nineteenth Day of July, 2022

Katherine Kelly Vidal
*Director of the United States Patent and Trademark Office*